(12) United States Patent
Kim et al.

(10) Patent No.: US 7,473,308 B2
(45) Date of Patent: Jan. 6, 2009

(54) GEL CONTAINING PHOSPHATE SALTS FOR PASSIVATION

(75) Inventors: Sang Jin Kim, Pusan (KR); Seong Shik Park, Seoul (KR)

(73) Assignee: Chunwoo Tech Co., Ltd., Pusan (KR)

( * ) Notice: Subject to any disclaimer, the term of this patent is extended or adjusted under 35 U.S.C. 154(b) by 0 days.

(21) Appl. No.: 11/858,285

(22) Filed: Sep. 20, 2007

(65) Prior Publication Data

US 2008/0207477 A1 Aug. 28, 2008

(30) Foreign Application Priority Data

Sep. 21, 2006 (KR) ...................... 10-2006-0091729

(51) Int. Cl.
*C04B 9/02* (2006.01)

(52) U.S. Cl. .............. 106/14.12; 106/14.41; 106/14.44; 106/14.34; 106/14.05; 510/254

(58) Field of Classification Search ................ 510/254; 428/423.1, 469; 528/75; 148/243, 253, 254, 148/259; 106/14.12, 14.41, 14.44
See application file for complete search history.

(56) References Cited

U.S. PATENT DOCUMENTS

| | | | | |
|---|---|---|---|---|
| 2,296,884 A * | 9/1942 | Thompson | ................... | 148/264 |
| 2,764,242 A * | 9/1956 | Rohrback et al. | ............ | 507/106 |
| 2,812,296 A * | 11/1957 | Neish | ........................... | 205/50 |
| 3,400,023 A * | 9/1968 | McDonald et al. | .......... | 148/250 |
| 3,505,244 A * | 4/1970 | Cessna | ........................ | 252/391 |
| 4,533,525 A * | 8/1985 | Minamide et al. | ........... | 428/469 |
| 4,975,330 A * | 12/1990 | Mosser | ..................... | 428/472.1 |
| 5,143,562 A * | 9/1992 | Boulos | ........................ | 148/247 |
| 5,238,505 A * | 8/1993 | Kaiser | ......................... | 148/259 |
| 5,478,413 A * | 12/1995 | Mosser et al. | ................ | 148/261 |
| 5,868,820 A * | 2/1999 | Claffey | ..................... | 106/14.44 |
| 6,165,257 A * | 12/2000 | Heimann et al. | .......... | 106/14.21 |
| 6,190,779 B1 * | 2/2001 | Heimann et al. | ............ | 428/469 |
| 6,485,550 B2 * | 11/2002 | Hirose | ...................... | 106/14.44 |
| 6,509,099 B1 * | 1/2003 | Urata et al. | .............. | 428/423.1 |
| 6,585,933 B1 * | 7/2003 | Ehrhardt et al. | ............... | 422/16 |
| 6,835,702 B2 * | 12/2004 | Herdt et al. | .................. | 510/219 |
| 7,208,054 B2 * | 4/2007 | Nakazawa | ................... | 148/253 |
| 7,311,944 B2 * | 12/2007 | Sambasivan et al. | ......... | 427/328 |
| 2001/0024729 A1 * | 9/2001 | Heimann et al. | ............ | 428/469 |
| 2003/0015686 A1 * | 1/2003 | Hartley et al. | .................. | 252/70 |
| 2003/0188807 A1 * | 10/2003 | Meagher | ..................... | 148/247 |
| 2005/0187326 A1 * | 8/2005 | Nakazawa | ................... | 524/417 |
| 2005/0202989 A1 * | 9/2005 | Wilson | ........................ | 510/245 |
| 2005/0242319 A1 * | 11/2005 | Posson et al. | ................... | 252/2 |

FOREIGN PATENT DOCUMENTS

| | | | |
|---|---|---|---|
| KR | 1984-0005227 B1 | | 3/1986 |
| KR | 10-0397049 B1 | | 2/2000 |
| KR | 10-0324089 B1 | | 7/2002 |
| KR | 100324089 | * | 7/2002 |
| KR | 10-0491178 B1 | | 8/2002 |
| KR | 100397049 | * | 9/2003 |
| KR | 10-0491178 B1 | | 5/2005 |
| KR | 100491178 | * | 5/2005 |
| KR | 10-0536884 B1 | | 12/2005 |
| KR | 100536884 | * | 12/2005 |
| KR | 10-0554895 B1 | | 2/2006 |

* cited by examiner

*Primary Examiner*—Mark Eashoo
*Assistant Examiner*—M. Reza Asdjodi
(74) *Attorney, Agent, or Firm*—Maeng-Ho Shin

(57) ABSTRACT

Disclosed herein is a phosphate gel for passivation, which is used for the acid washing and phosphate coating of a corroded metal surface. The phosphate gel contains phosphate and gum.

2 Claims, 6 Drawing Sheets

GEL CONTAINING PHOSPHATE SALTS FOR PASSIVATION

BACKGROUND OF THE INVENTION

1. Field of the Invention

The present invention relates to a phosphate gel for passivation, which is used to remove corrosion, caused by welding, from the pipelines, towers, valves and the like of structures installed in ships, manufactured in shipyards, or large-sized engines, manufactured in heavy industrial companies, and to form a phosphate coating film on the pipelines and the like.

2. Background of the Related Art

Forming layers of metal compounds by causing chemical changes (oxidation, reduction, substitution, alloying, etc.) on metal surfaces is referred to as chemical coating, the most typical of which is phosphate coating. Phosphate coating refers to making on metal a new, non-metallic and non-conductive surface. That is, phosphate coating refers to making an inorganic crystal or an amorphous coating film on metals, such as steel, aluminum, zinc, cadmium, or alloys thereof, and is also called "Parkerizing" or Bonderizing" (Amchem Products, Inc., USA). Also, the phosphate coating, which is carried out using a simple method and equipment, incurs low production cost and is economical. Prior patents relating to the formation of phosphate coatings are as follows: Korean Patent Registration No. 1984-0005227, entitled "Phosphating agent for use at room temperature and use thereof"; Korean Patent Registration No. 10-0324089, entitled "Method for forming phosphate-based coating on metal surface"; Korean Patent Registration No. 10-0397049, entitled "Method and apparatus for forming phosphate coating on steel wire"; and Korean Patent Registration No. 10-0536884, entitled "Zinc-calcium-based phosphate coating/coloring agent and method of forming phosphate coating using the same". In said patents, a dipping process is carried out in the liquid phase. Also, Korean Patent Registration No. 10-0491178, entitled "Electro-phosphate coating method", and Korean Patent Registration No. 10-0554895, entitled "Phosphate coating system and chemical coating system", employ electrolysis. As described above, phosphatizing agents, which are currently used in the industrial field, are in the liquid phase and do not employ gel-type phosphate.

SUMMARY OF THE INVENTION

Generally, in processes of connecting pipelines, towers, valves and the like on structures, which are installed in LPG ships, large-sized ships or large-sized engines before the delivery of the ships or engines, a welding operation is carried out, and the weld zones are subjected to acid washing and passivation treatment. In this case, all the operations are carried out on the decks of ships, and thus, when acid washing and passivation treatment are carried out with nitric acid and hydrofluoric acid, toxic gas will be generated due to nitric acid and hydrofluoric acid, making the operations difficult. Also, when the treatment solution is dropped on a floor, it will change the painting of the floor and generate toxic gas, making the operations difficult. For these reasons, there is currently a limitation on the use of passivating agents, which contain nitric acid and hydrofluoric acid. Thus, the use of phosphate has been attempted. The use of phosphate is advantageous in that toxic gas is not generated, but is disadvantageous in that, on a portion having severe weld corrosion therein, phosphate should be applied for a long time. That is, in the case of weld zones on valves, pipelines or the like, liquid phosphate runs down, making it difficult to apply the phosphate for a long time. This makes it difficult to form a phosphate coating film, thus making it difficult to perform passivation treatment. To solve these problems, according to the present invention, phosphate, which is used as an agent for acid washing and coating film formation, is prepared as gel. The present inventors have found that, when the prepared phosphate gel is applied on weld zones, it will not run down for a long time, and thus, achieve perfect acid washing and form a phosphate coating film, thereby completing the present invention.

DETAILED DESCRIPTION OF THE PREFERRED EMBODIMENT

Hereinafter, the present invention will be described in detail.

The present invention provides a phosphate gel, which can simultaneously perform the acid washing and surface treatment of pipelines, valves, towers, engines or structures, comprising a corroded metal material, and does not run down when it is applied on surfaces. The phosphate gel according to the present invention contains phosphoric acid and a gelling agent as main components and is prepared by adding zinc powder, calcium phosphate, sodium molybdate, gluconic acid, a non-ionic surfactant and the like to the main components.

Figure 1:
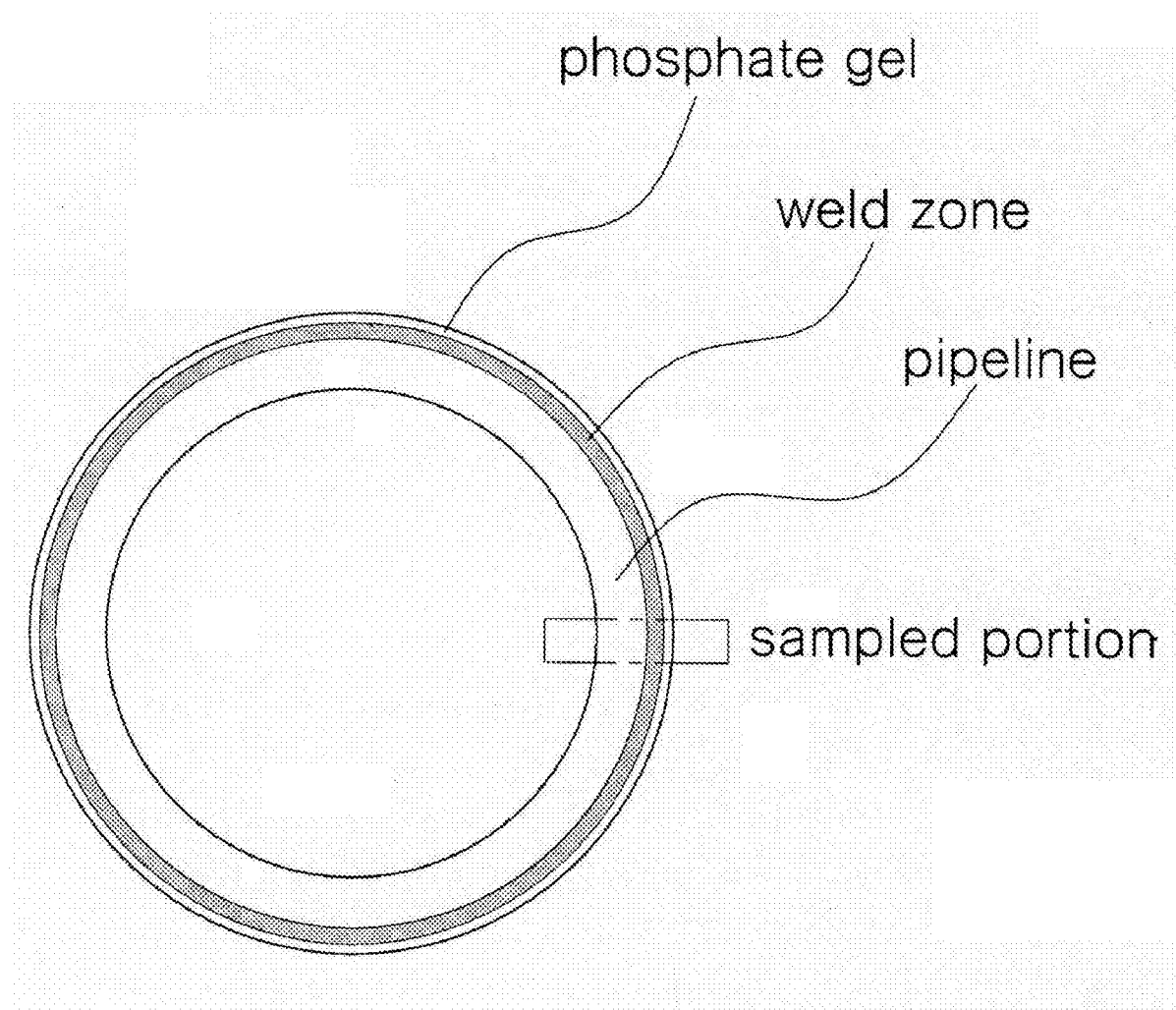
FIG. 1 is a cross-sectional view showing that a phosphate gel is applied on the weld zone of a pipeline.
Figure 2:
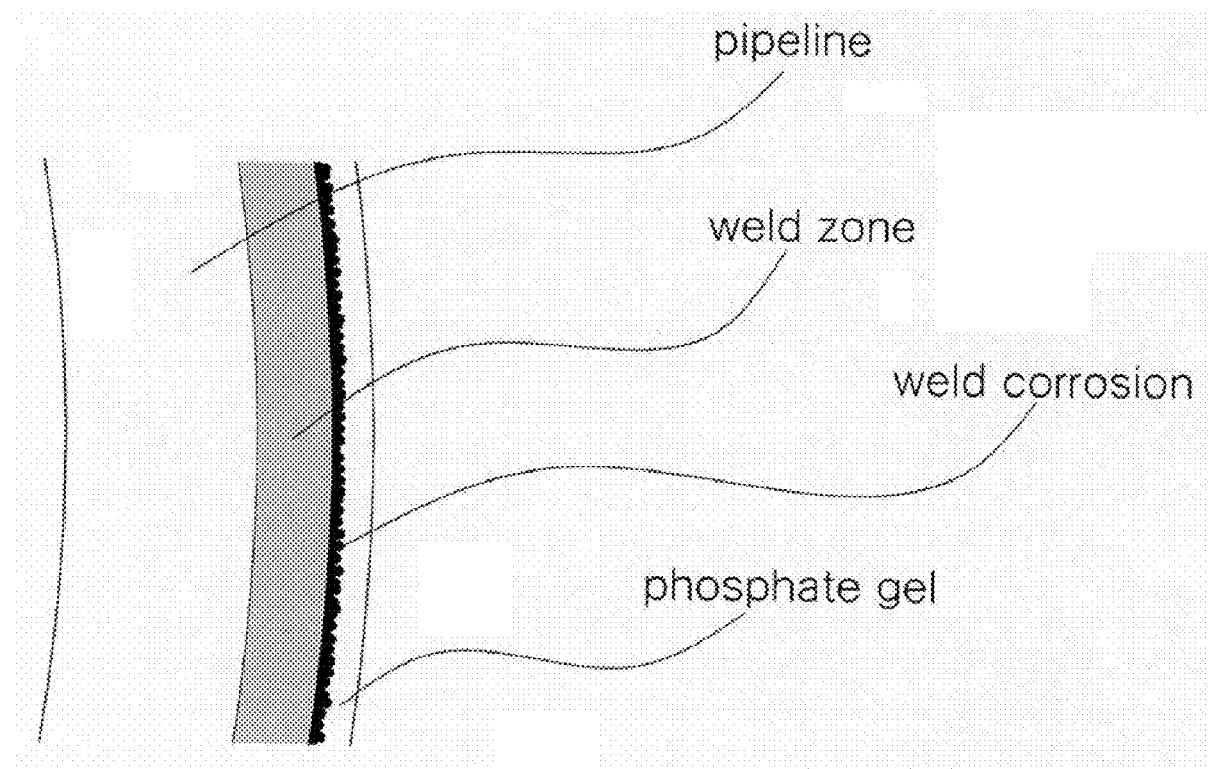
FIG. 2 is a cross-sectional view showing that the phosphate gel has been applied on the pipeline having corrosion caused by welding.
Figure 3:
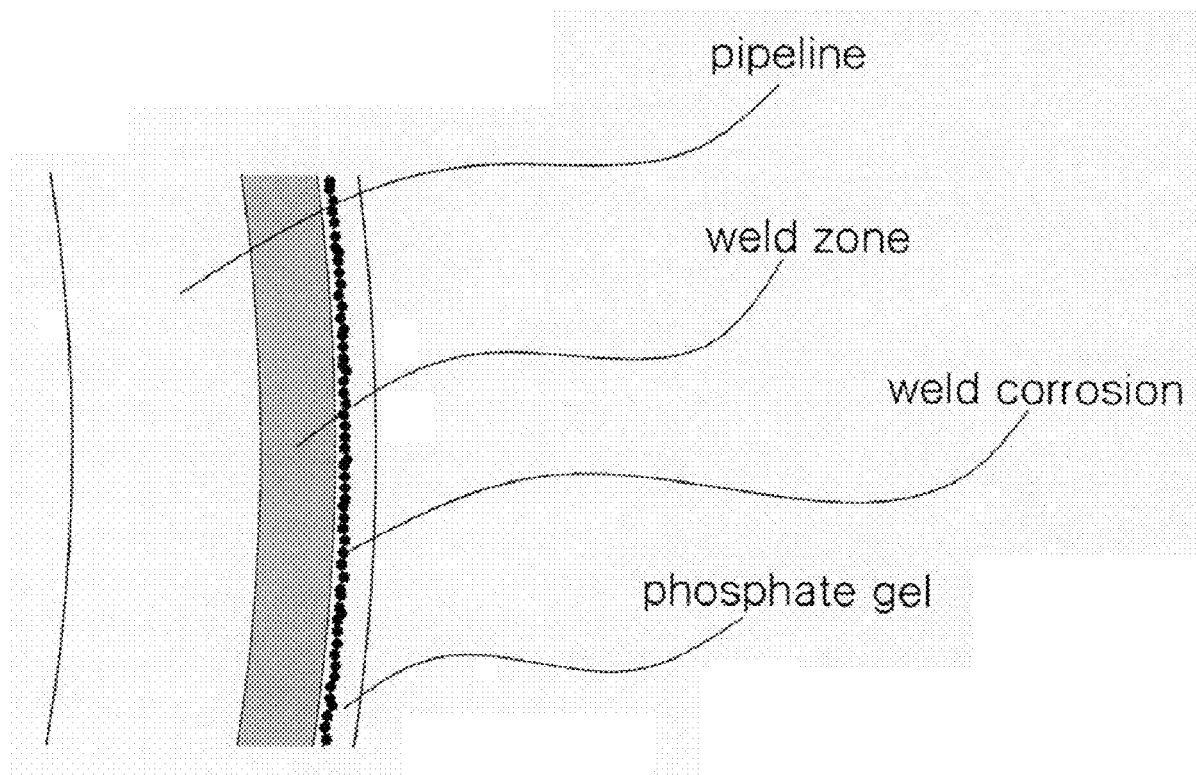
FIG. 3 is a cross-sectional view showing corrosion has been removed from the weld zone of the pipeline by acid washing.
Figure 4:
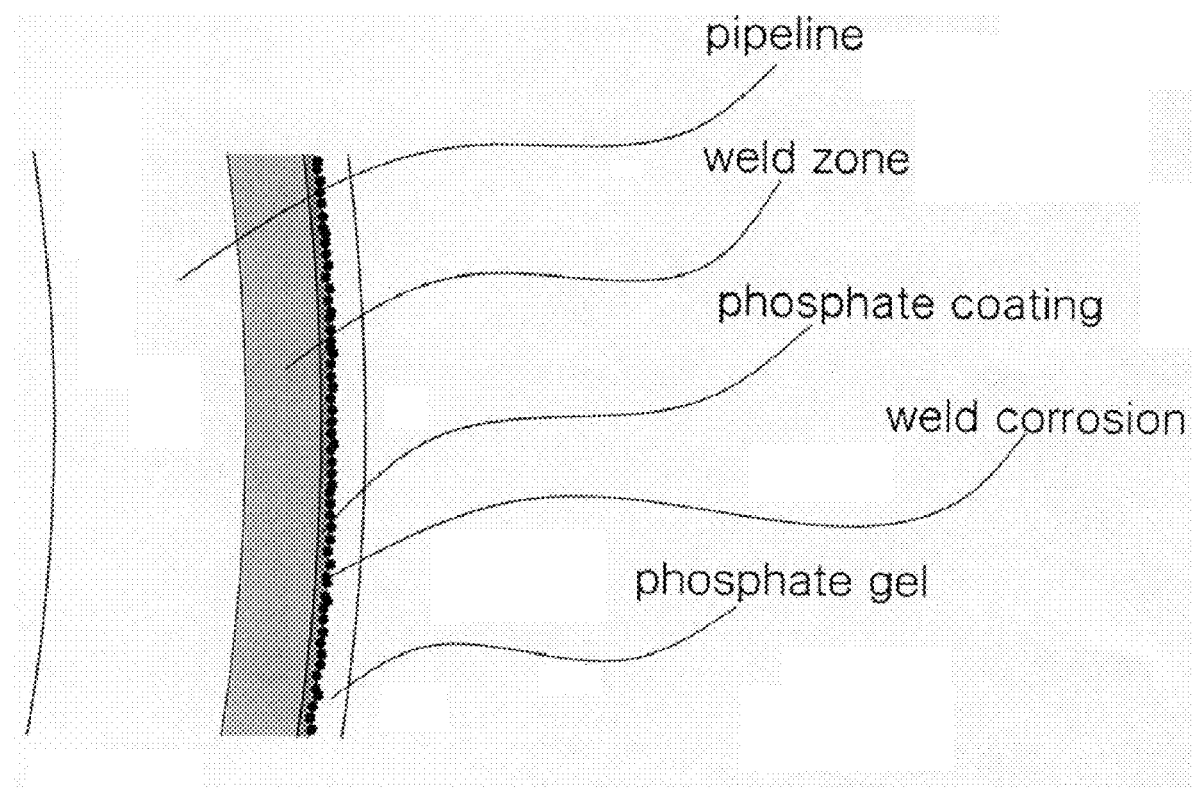
FIG. 4 is a cross-sectional view showing that a phosphate coating film has been formed on the surface of the welding zone of the pipeline.

It could be seen that the phosphate gel according to the present invention was excellent in acid washing and surface treatment properties, as shown in FIGS. 1 to 4. FIG. 1 is a cross-sectional view showing that the phosphate gel has been applied on a pipeline having corrosion caused by welding. FIG. 2 is an enlarged cross-sectional view of the portion of the pipeline, from which a sample was taken. As shown in FIG. the weld zone of the pipeline has corrosion. As shown in FIG. 3, the corrosion is removed from the weld zone by the action of phosphoric acid contained in the phosphate gel, and as shown in FIG. 4, a phosphate coating film is formed on the weld zone. When the gel is removed, the phosphate coating film remains.

Hereinafter, the present invention will be described in further detail with reference to the following examples.

Example 1

Figure 5:
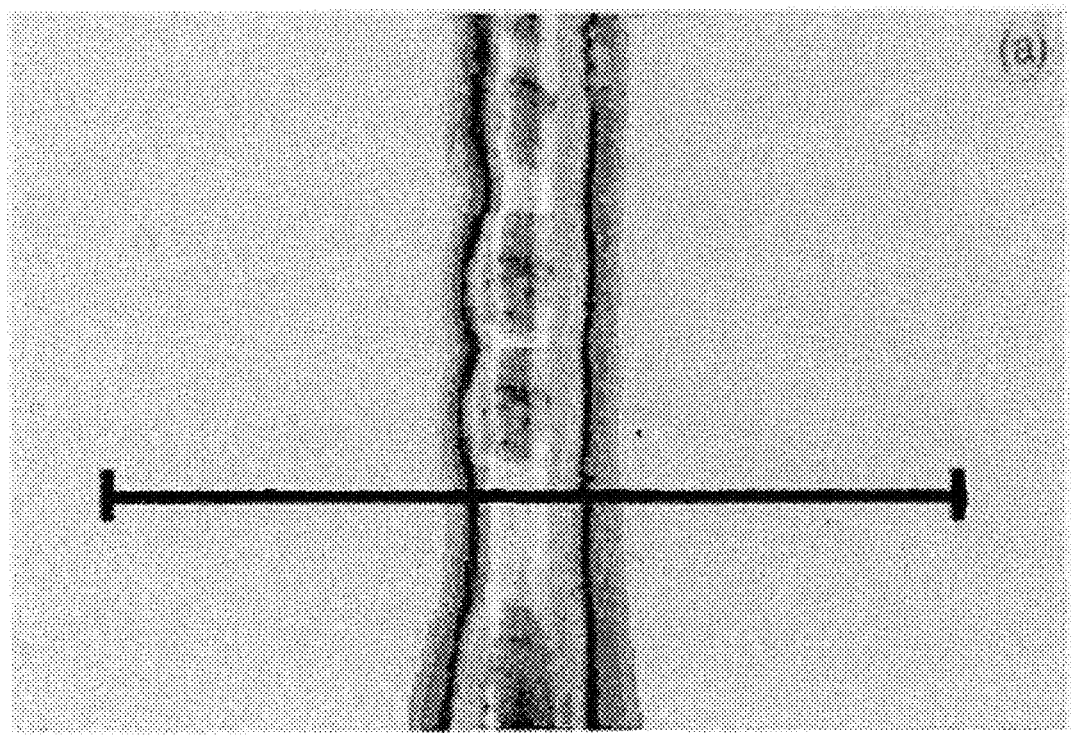
FIG. 5 shows the potential difference of the surface of the weld zone of a pipeline, which has liquid-phase phosphate coated thereon.
Figure 5:
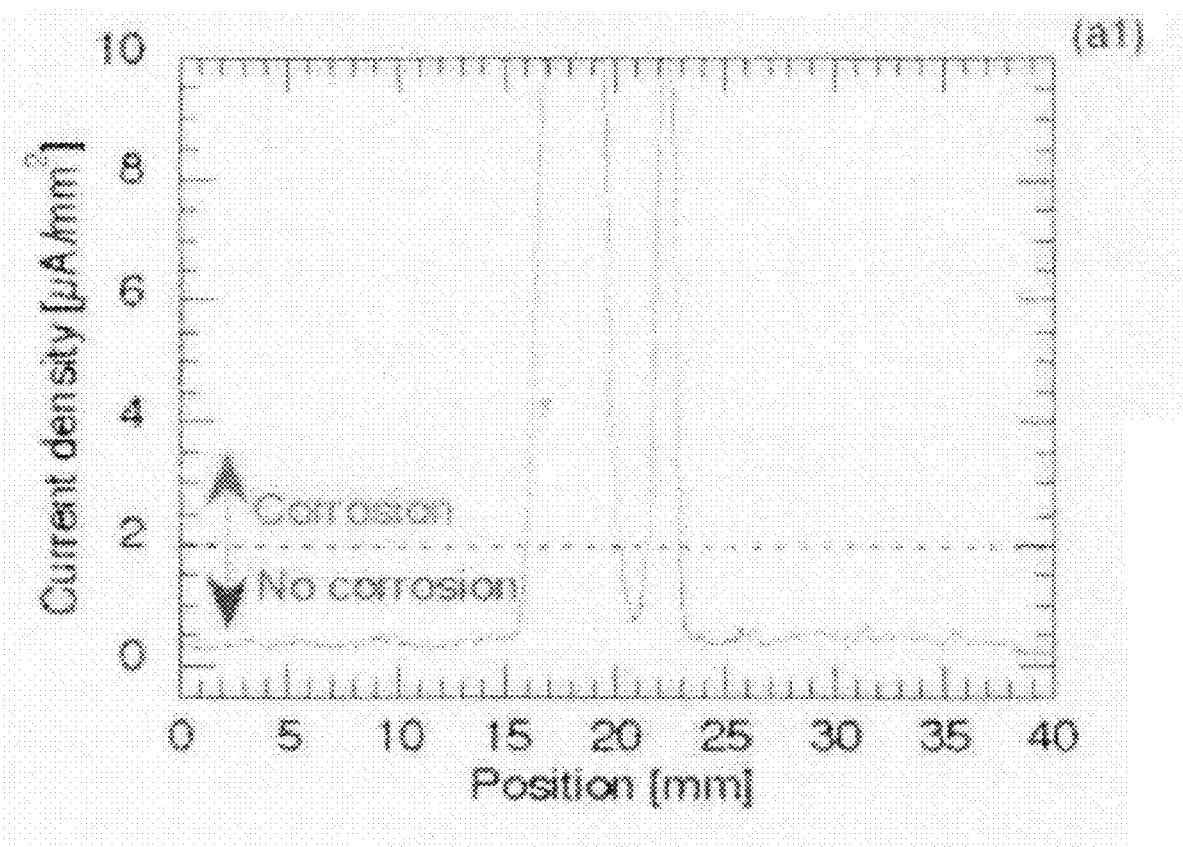
Figure 6:
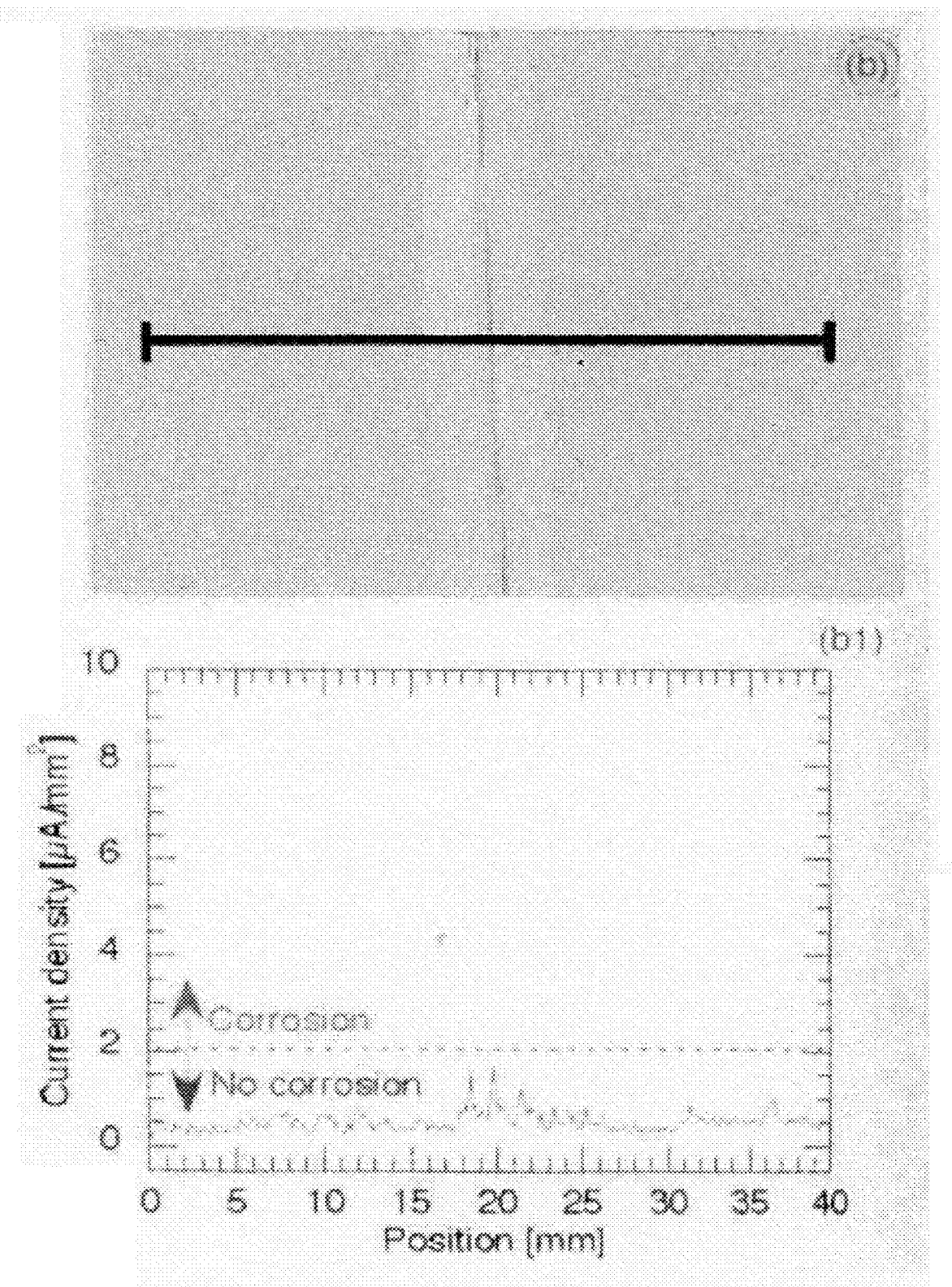
FIG. 6 shows the potential difference of the surface of the weld zone of a pipeline, which has the inventive phosphate gel coated thereon.

An aqueous phosphate solution, containing 70 wt % of phosphoric acid, 5 wt % of zinc powder, 3 wt % of calcium phosphate, 2 wt % of sodium molybdate, 5 wt % of gluconic acid, 0.2 wt % of a non-ionic surfactant, 2 wt % of gellan gum and 12.8 wt % of water, was heated at 90° C. for about 30 seconds, and then cooled to room temperature, thus preparing a phosphate gel having a viscosity of 1400 cP. A pipeline having corrosion caused by welding was measured for its appearance and current density, and the measurement results are shown in FIG. 5. In FIG. 5, positions having corrosion caused by welding shows high current density. It could be seen that, when the phosphate gel was applied on the pipeline having weld corrosion, it was applied to a thickness of about 2 mm and did not run down. At 12 hours after the application of the phosphate gel, the phosphate gel was removed, and the surface of the pipeline was washed with a wet towel and dried. As a result, as shown in FIG. 6, it could be seen that the surface of the pipeline became clean, and the corrosion was substantially completely removed from the pipeline. Also, the current density of the pipeline treated with the phosphate gel was measured. As a result, as can be seen in FIG. 6, the current density was low and maintained at a constant level, suggesting that a phosphate coating film, was successfully formed on the pipeline. The above results are summarized in Table 1 below.

Example 2

An aqueous phosphate solution, containing 50 wt % of phosphoric acid, 10 wt % of zinc powder, 5 wt % of calcium phosphate, 5 wt % of sodium molybdate, 10 wt % of gluconic acid, 1 wt % of a non-ionic surfactant, 4 wt % of gellan gum and 15 wt % of water, was heated at 90° C. for about heated, and then cooled to room temperature, thus preparing a phosphate gel having a viscosity of 2500 cP. It could be seen that, when the phosphate gel was applied to a thickness of about 3 mm on a pipeline having corrosion caused by welding, it did not run down. At 12 hours after the application of the phosphate gel, the phosphate gel was removed, and the surface of the pipeline was washed with a wet towel and dried. As a result, the corrosion was substantially completely removed from the pipeline, and a phosphate coating film was successfully formed on the pipeline. The results are shown in Table 1.

Example 3

An aqueous phosphate solution, containing 50 wt % of phosphoric acid, 10 wt % of zinc powder, 5 wt % of calcium phosphate, 5 wt % of sodium molybdate, 10 wt % of gluconic acid, 1 wt % of a non-ionic surfactant, 2 wt % of gellan gum and 17 wt % of water, was heated at 90° C. for about 30 seconds, and then cooled to room temperature, thus preparing a phosphate gel having a viscosity of 1200 cP. It could be seen that, when the phosphate gel was applied to a thickness of about 2 mm on a pipeline having corrosion caused by welding, it did not run down. At 12 hours after the application of the phosphate gel, the phosphate gel was removed, and the surface of the pipeline was washed with a wet towel and dried. As a result, it could be seen that the corrosion was substantially completely removed from the pipeline, and phosphate coating film was successfully formed on the pipeline. The results are shown in Table 1.

Example 4

An aqueous phosphate solution, containing 50 wt % of phosphoric acid, 10 wt % of zinc powder, 5 wt % of calcium phosphate, 5 wt % of sodium molybdate, 10 wt % of gluconic acid, 1 wt % of a non-ionic surfactant and 18 wt % of water, was heated at 90° C. for about 30 seconds, and then cooled to room temperature, thus preparing a phosphate gel having a viscosity of 700 cP. It could be seen that, when the phosphate gel was applied to a thickness of about 1 mm on a pipeline having corrosion caused by welding, it did not run down. At 12 hours after the application of the phosphate gel, the phosphate gel was removed, and the surface of the pipeline was washed with a wet towel and dried. As a result, it could be seen that the corrosion was substantially completely removed, and a phosphate coating film was successfully formed on the pipeline. The results are shown in Table 1.

Example 5

An aqueous phosphate solution, containing 30 wt % of phosphoric acid, 0.5 wt % of zinc powder, 0.5 wt % of calcium phosphate, 0.5 wt % of sodium molybdate, 0.5 wt % of gluconic acid, 0.1 wt % of a non-ionic surfactant, 1 wt % of gellan gum and 66.9 wt % of water, was heated at 90° C. for about 30 seconds, and then cooled to room temperature, thus preparing a phosphate gel having a viscosity of 600 cP. It could be seen that, when the phosphate gel was applied to a thickness of about 1 mm on a pipeline having corrosion caused by welding, it did not run down. At 12 hours after the application of the phosphate gel, the phosphate gel was removed, and the surface of the pipeline was washed with a wet towel and dried. As a result, it could be seen that the corrosion was removed by about 60%, and a phosphate coating film was not successfully formed on the pipeline. The results are shown in Table 1.

Example 6

A phosphate gel having a viscosity of 1100 cP was prepared in the same manner as in Example 1, except that 2 wt % of arabic gum was used instead of gellan gum. It could be seen that, when the phosphate gel was applied to a thickness of about 2 mm on a pipeline having corrosion caused by welding, it did not run down. At 12 hours after the application of the phosphate gel, the phosphate gel was removed, and the surface of the pipeline was washed with a wet towel and dried. As a result, it could be seen that the corrosion was substantially completely removed from the pipeline, and a phosphate coating film was successfully formed on the pipeline. The results are shown in Table 1.

Example 7

A phosphate gel having a viscosity of 1800 cP was prepared in the same manner as in Example 1, except that 2 wt % of tamarind gum was used instead of gellan gum. It could be seen that, when the phosphate gel was applied to a thickness of about 2 mm on a pipeline having corrosion caused by welding, it did not run down. At 12 hours after the application of the phosphate gel, the phosphate gel was removed, and the surface of the pipeline was washed with a wet towel and dried. As a result, it could be seen that the corrosion was substantially completely removed from the pipeline, and a phosphate coating film was successfully formed on the pipeline. The results are shown in Table 1.

Example 8

A phosphate gel having a viscosity of 1300 cP was prepared in the same manner as in Example 1, except that 2 wt % of carrageenan was used instead of gellan gum. It could be seen that, when the phosphate gel was applied to a thickness of about 2 mm on a pipeline having corrosion caused by welding, it did not run down. At 12 hours after the application of the phosphate gel, the phosphate gel was removed, and the surface of the pipeline was washed with a wet towel and dried. As a result, it could be seen that the corrosion was removed by about 100%, and a phosphate coating film was successfully formed on the pipeline. The results are shown in Table 1.

Example 9

A phosphate gel having a viscosity of 450 cP was prepared in the same manner as in Example 1, except that 2 wt % of CMC (carboxymethyl cellulose) was used instead of gellan gum. It could be seen that, when the phosphate gel was applied to a thickness of about 2 mm on a pipeline having corrosion caused by welding, it did not run down. At 12 hours after the application of the phosphate gel, the phosphate gel was removed, and the surface of the pipeline was washed with a wet towel and dried. As a result, it could be seen that the corrosion was removed by about 40%, and a phosphate coating film on the pipeline was inferior. The results are shown in Table 1.

Comparative Example 1

A phosphate coating agent, which is generally used, is an aqueous phosphate solution containing 40 wt % of phosphoric acid, 10 wt % of zinc oxide, 10 wt % of calcium carbonate and 5 wt % of citric acid and has a viscosity of about 12 cP. It could be seen that, when the liquid phosphate coating agent was applied on a pipeline corrosion caused by welding, the bulk of the phosphate coating agent did run down, and it was applied to a thickness of less than 0.1 mm due to surface tension. At 12 hours after the surface treatment, the pipeline was washed with water and dried. As a result, it could be seen that the corrosion was not substantially removed, and the pipeline maintained the original appearance. Also, a phosphate coating film was not formed on the pipeline.

As shown in FIG. 1, in the phosphate gel containing gum or carrageenan, prepared according to the present invention, acid washing and coating film formation were successfully performed, whereas, in the case of using CMC as a gelling agent and the case of using the liquid phosphate coating agent, acid washing and coating film formation were not sufficiently achieved.

TABLE 1

|  | Phosphoric acid (wt %) | Zinc (wt %) | Calcium phosphate (wt %) | Sodium molybdate (wt %) | Gluconic acid (wt %) | Non-ionic surfactant (wt %) | Water (wt %) | Gelling agent (wt %) | Viscosity (cP) | State of coating film |
|---|---|---|---|---|---|---|---|---|---|---|
| Ex. 1 | 70 | 5 | 3 | 2 | 5 | 0.2 | 12.8 | 2 (gellan gum) | 1400 | ○ |
| Ex. 2 | 50 | 10 | 5 | 5 | 10 | 1.0 | 15.0 | 4 (gellan gum) | 2500 | ○ |
| Ex. 3 | 50 | 10 | 5 | 5 | 10 | 1.0 | 17.0 | 2 (gellan gum) | 1200 | ○ |
| Ex. 4 | 50 | 10 | 5 | 5 | 10 | 1.0 | 18.0 | 1 (gellan gum) | 700 | ○ |
| Ex. 5 | 30 | 0.5 | 0.5 | 0.5 | 0.5 | 0.1 | 66.9 | 1 (gellan gum) | 600 | ○ |
| Ex. 6 | 70 | 5 | 3 | 2 | 5 | 0.2 | 12.8 | 2 (arabic gum) | 1100 | ○ |
| Ex. 7 | 70 | 5 | 3 | 2 | 5 | 0.2 | 12.8 | 2 (tamarind gum) | 1800 | ○ |
| Ex. 8 | 70 | 5 | 3 | 2 | 5 | 0.2 | 12.8 | 2 (carrageenan) | 1300 | ○ |
| Ex. 9 | 70 | 5 | 3 | 2 | 5 | 0.2 | 12.8 | 2 (CMC) | 450 | X |
| Comp. Ex. | 40 | 10 (zinc oxide) | 10 (calcium carbonate) |  | 5 (citric acid) |  | 35.0 |  | 12 | X |

As described above, the phosphate gel according to the present invention can simultaneously perform acid washing and passivation by phosphate coating, and does not generate SOx, NOx and toxic gas during operations, because it does not contain strong acids, such as nitric acid, sulfuric acid, hydrochloric acid and hydrofluoric acid. In the prior art, pipelines and valves, which are installed in large-sized ships, LNG ships, oil tankers, large-sized pump towers, engine systems or the like, are welded at places where they are finally installed. Thus, because the removal of impurities caused by weld corrosion and the passivation with phosphate coating are carried out on decks and closed spaces, it is impossible to perform dipping treatment using the prior liquid phosphate and to apply the liquid phosphate for a long time, because it runs down during the application process. However, when the phosphate gel according to the present invention is applied to weld zones, the phenomenon that the gel runs down or is dropped on floors does not occur. Accordingly, the phosphate gel of the present invention can remove impurities caused by weld corrosion and can be applied for a long time for the formation of a phosphate coating film, thus increasing operation efficiency.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A phosphate gel for passivation, which is used for the acid washing and phosphate coating of a corroded metal material, in which the phosphate gel is prepared by heating and cooling an aqueous phosphate solution, containing 30-70 wt % of phosphoric acid, 0.5-10 wt % of zinc powder, 0.5-5 wt % of calcium phosphate, 0.5-5 wt % of sodium molybdate, 0.5-10 wt % of gluconic acid, 0.1-1 wt % of a non-ionic surfactant, 1-4 wt % of gum and 12.8-66.9 wt % of water.

2. The phosphate gel of claim 1, wherein the gum is selected from the group consisting of gellan gum, Arabic gum, tamarind gum and carrageenan.

* * * * *